US011121889B1

(12) United States Patent
Liu et al.

(10) Patent No.: US 11,121,889 B1
(45) Date of Patent: Sep. 14, 2021

(54) APPARATUSES AND METHODS FOR ROUTING PACKETS BETWEEN A TIME-SENSITIVE NETWORKING (TSN) NETWORK AND A NON-TSN NETWORK BY VIRTUAL LOCAL AREA NETWORK (VLAN) TAG MANIPULATION

(71) Applicant: MOXA INC., New Taipei (TW)

(72) Inventors: Chi-Chuan Liu, New Taipei (TW); Chun-Yu Lin, New Taipei (TW); Chien-Yu Lai, New Taipei (TW); Wen-Lu Liao, New Taipei (TW)

(73) Assignee: MOXA INC., New Taipei (TW)

( * ) Notice: Subject to any disclaimer, the term of this patent is extended or adjusted under 35 U.S.C. 154(b) by 0 days.

(21) Appl. No.: 16/901,224

(22) Filed: Jun. 15, 2020

(51) Int. Cl.
*H04L 12/46* (2006.01)
*H04L 29/06* (2006.01)

(52) U.S. Cl.
CPC ...... *H04L 12/4645* (2013.01); *H04L 12/4633* (2013.01); *H04L 12/4679* (2013.01); *H04L 65/608* (2013.01)

(58) Field of Classification Search
CPC ............. H04L 12/4645; H04L 12/4633; H04L 12/4679; H04L 65/608
See application file for complete search history.

(56) References Cited

U.S. PATENT DOCUMENTS

| | | | | |
|---|---|---|---|---|
| 2015/0103831 | A1* | 4/2015 | Chandhoke | ....... H04L 12/40097 370/392 |
| 2018/0184438 | A1* | 6/2018 | Cavalcanti | ............ H04W 74/04 |
| 2018/0316557 | A1* | 11/2018 | Frangieh | ................. H04L 67/34 |
| 2019/0239172 | A1* | 8/2019 | Hampel | ................ H04W 76/12 |
| 2019/0253339 | A1* | 8/2019 | Mehmedagic | ...... H04L 45/3065 |
| 2019/0386935 | A1* | 12/2019 | Back | ...................... H04L 49/205 |
| 2020/0259896 | A1* | 8/2020 | Sachs | ................. G07C 9/00174 |
| 2020/0267785 | A1* | 8/2020 | Talebi Fard | ........ H04W 40/248 |
| 2021/0007160 | A1* | 1/2021 | Sivasiva Ganesan | ...................... H04W 48/16 |
| 2021/0022154 | A1* | 1/2021 | Cavalcanti | .......... H04W 72/005 |
| 2021/0029044 | A1* | 1/2021 | Bush | ...................... H04L 47/22 |

(Continued)

FOREIGN PATENT DOCUMENTS

WO 2020/098917 A1 5/2020

OTHER PUBLICATIONS

European Search Report dated Nov. 12, 2020, issued in application No. EP 20186165.5.

(Continued)

*Primary Examiner* — Blake J Rubin
(74) *Attorney, Agent, or Firm* — McClure, Qualey & Rodack, LLP (57) ABSTRACT

An apparatus including a storage medium and a controller is provided. The storage medium stores a first mapping of stream Identifiers (IDs) to VLAN tags, and a second mapping of the stream IDs to VLAN tag indications. The controller is coupled to the storage medium and configured to route a packet between a Time-Sensitive Networking (TSN) network and a non-TSN network according to the first and second mappings. The routing of the packet includes inserting or removing a VLAN tag in or from the packet according to the stream ID of the packet and the first and second mappings, so as to enable interoperability between the TSN network and the non-TSN network.

17 Claims, 6 Drawing Sheets

(56) References Cited

U.S. PATENT DOCUMENTS

2021/0044365 A1* 2/2021 Ohno .................... H04W 88/06

OTHER PUBLICATIONS

Tsn Task Group; "Bridges and Bridged Networks: Stream Reservation Protocol (SRP) Enhancements and Performance Improvements;" IEEE P802.1Qcc./D1.4; Mar. 2017; pp. 147-149.
Gerhard, T., et al.; "Software-defined Flow Reservation Configuring IEEE 802.1Q Time-Sensitive Networks by the Use of Software-Defined Networking;" 2019 24th IEEE International Conference on Emerging Technologies and Factory Automation (ETFA), IEEE; Sep. 2019; pp. 216-223.

* cited by examiner

APPARATUSES AND METHODS FOR ROUTING PACKETS BETWEEN A TIME-SENSITIVE NETWORKING (TSN) NETWORK AND A NON-TSN NETWORK BY VIRTUAL LOCAL AREA NETWORK (VLAN) TAG MANIPULATION

BACKGROUND OF THE APPLICATION

Field of the Application

The application generally relates to Time-Sensitive Networking (TSN), and more particularly, to apparatuses and methods for routing packets between a TSN network and a non-TSN network by Virtual Local Area Network (VLAN) tag manipulation.

Description of the Related Art

The rise of new digital industrial technology, known as Industry 4.0, is a transformation that makes it possible to gather and analyze data across machines, enabling faster, more flexible, and more efficient processes to produce higher-quality goods at reduced costs. One of the core entities in the center of Industry 4.0 are cyber-physical systems. By definition, these systems require a representation in cyberspace. For that, the Operations Technology (OT) networks which connect the production equipment and the Information Technology (IT) networks from the upper factory layers will need to converge.

Unfortunately, most of the industrial Ethernet standards from the current generation require proprietary hardware. This makes the convergence of networks close to impossible. The consequences are island networks that need gateways to be connected to other hierarchies. To meet these trends, Time-Sensitive Networking (TSN) technology has been proposed by the Institute of Electrical and Electronics Engineers (IEEE) 802.1 working groups which combines a set of IEEE standards in order to achieve real-time deterministic behavior, while being both vertically and horizontally scalable.

However, due to the TSN standards are still being under discussion among the IEEE 802.1 working groups, many details are not yet defined, including specific measures regarding how to enable the interoperability between a TSN network and a non-TSN network.

BRIEF SUMMARY OF THE APPLICATION

In order to solve the aforementioned problem, the present application proposes to route packets between a TSN network and a non-TSN network according to mappings of stream Identifiers (IDs) to Virtual Local Area Network (VLAN) tags and VLAN tag indications, so as to enable interoperability between the TSN network and the non-TSN network.

In one aspect of the application, an apparatus comprising a storage medium and a controller is provided. The storage medium is configured to store a first mapping of one or more first stream IDs to one or more first VLAN tags, and a second mapping of the one or more first stream IDs to one or more VLAN tag indications. The controller is coupled to the storage medium, and configured to route at least one packet between a TSN network and a non-TSN network according to the first mapping and the second mapping. Specifically, the routing of the packet comprises the following steps: identifying a second stream ID of the packet; determining whether the second stream ID matches one of the first stream IDs in the first mapping or in the second mapping; in response to the second stream ID matching one of the first stream IDs and the packet being routed from the non-TSN network to the TSN network, inserting a VLAN tag in the packet based on the first VLAN tag corresponding to the matched first stream ID in the first mapping; and in response to the second stream ID matching one of the first stream IDs and the packet being routed from the TSN network to the non-TSN network, removing a VLAN tag from the packet based on the VLAN tag indication corresponding to the matched first stream ID in the second mapping.

In another aspect of the application, a method, executed by an apparatus connecting a TSN network and a non-TSN network, is provided. The method comprises routing at least one packet between the TSN network and the non-TSN network according to a first mapping of one or more first stream IDs to one or more first VLAN tags and a second mapping of the one or more first stream IDs to one or more VLAN tag indications. Specifically, the routing of the packet comprises the following steps: identifying a second stream ID of the packet; determining whether the second stream ID matches one of the first stream IDs in the first mapping or in the second mapping; in response to the second stream ID matching one of the first stream IDs and the packet being routed from the non-TSN network to the TSN network, inserting a VLAN tag in the packet based on the first VLAN tag corresponding to the matched first stream ID in the first mapping; and in response to the second stream ID matching one of the first stream IDs and the packet being routed from the TSN network to the non-TSN network, removing a VLAN tag from the packet based on the VLAN tag indication corresponding to the matched first stream ID in the second mapping.

Other aspects and features of the present application will become apparent to those with ordinarily skill in the art upon review of the following descriptions of specific embodiments of the apparatuses and methods for routing packets between a TSN network and a non-TSN network by VLAN tag manipulation.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
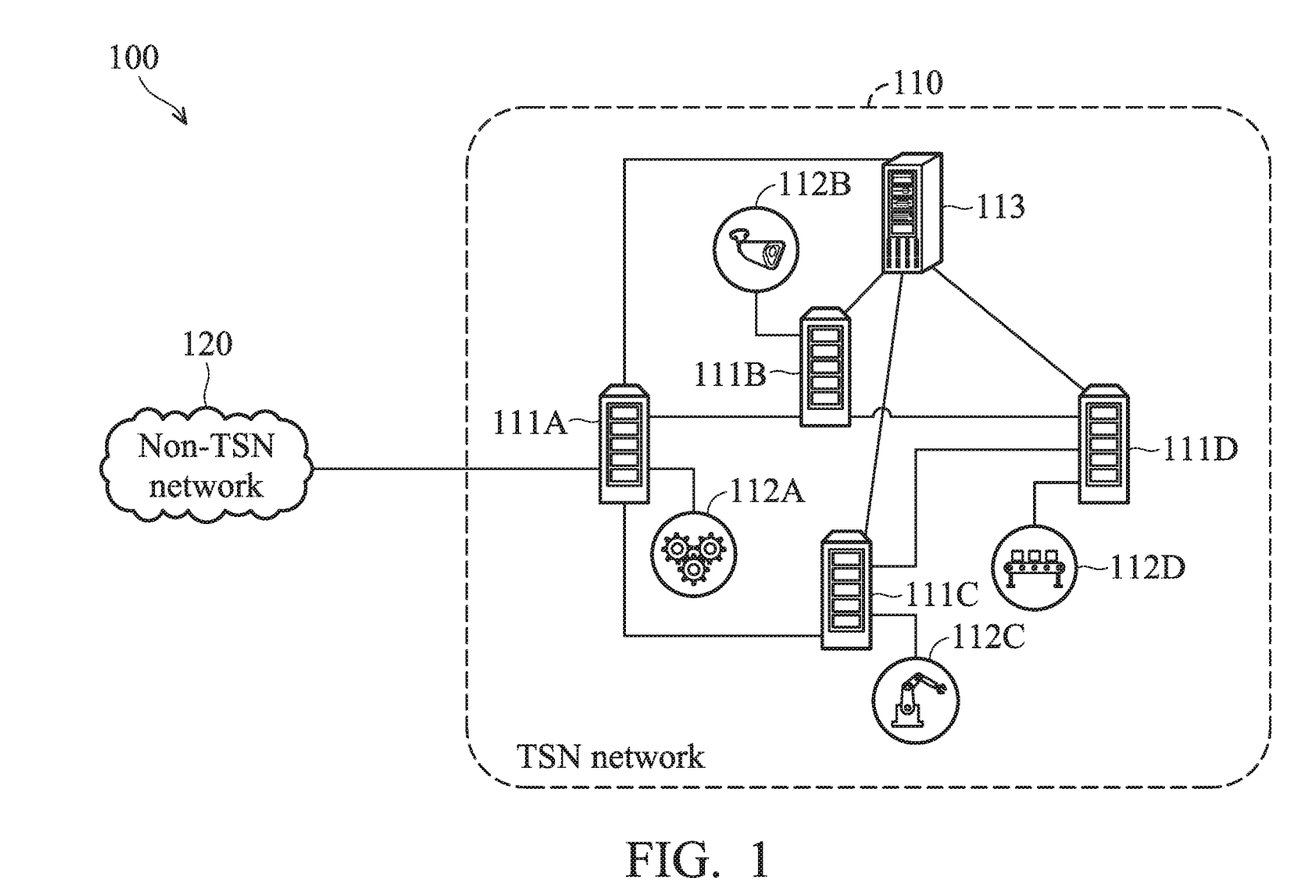
FIG. 1 is a block diagram of a heterogeneous network environment according to an embodiment of the application.

FIG. 1 is a block diagram of a heterogeneous network environment according to an embodiment of the application.

As shown in FIG. 1, the heterogeneous network environment 100 includes a TSN network 110 and a non-TSN network 120, wherein the TSN network 110 and the non-TSN network 120 are connected by a TSN gateway 111A to enable interoperability between the TSN network 110 and the non-TSN network 120.

The TSN network 110 may include multiple network devices 111A~111D, wherein the network device 111A may be a TSN gateway and the network devices 111B~111D may be TSN switches, In addition, the TSN network 120 may include multiple terminal devices 112A~112D and a Central Network Configuration (CNC) server, wherein the CNC server 113 is connected with the network devices 111A~111D to manage the configuration of the network devices 111A~111D. Each of the network devices 111A~111D may connect with one or more terminal devices. For example, the network device 111A is connected with a machinery 112A, the network device 111B is connected with a security camera 112B, the network device 111C is connected with a robotic arm 112C, and the network device 111D is connected with a conveyor 112D.

Each of the network devices 111A~111D is responsible for connecting the terminal devices 112A~112D to the TSN network 110, to enable real-time deterministic communication within the TSN network 110. In particular, one of the network devices, such as the network device 111A, is configured to serve as a TSN gateway connecting the TSN network 110 and the non-TSN network 120 for routing packets of data streams between the TSN network 110 and the non-TSN network 120.

The CNC server 113 is responsible for managing the configuration of the network devices 111A and 111D to realize real-time deterministic communication within the TSN network 110. Specifically, the CNC server 113 may perform the topology discovery procedure to determine the topology of the TSN network 110, and based on the topology and other factors, determine the communication paths for packets of data streams. The other factors may include the latency information of the data streams communicated in the TSN network 110, and the loading information of the network devices 111A~111D for routing the packets of the data streams.

In one embodiment, the CNC server 113 may provide mappings of stream Identifiers (IDs) to VLAN tags and VLAN tag indications (i.e., indications of whether to remove or keep the VLAN tag in a packet) to the network device 111A, to configure the communication paths for packets communicated between the TSN network 110 and the non-TSN network 120. Likewise, the CNC server 113 may provide a respective mapping of stream IDs to VLAN tags and VLAN tag indications to each of the network devices 111B~111D, to configure the communication paths for packets communicated in the TSN network 110.

Specifically, the mappings provided to the network devices 111A~111D are determined based on the topology of the TSN network 110, and the stream IDs and the latency information of the data streams and/or the loading information of the network devices 111A~111D.

Each stream ID in the mappings may be presented as at least one of the following: a Destination Address (DA), a Source Address (SA), an Ethertype, and a Subtype, wherein the DA, the SA, and the Ethertype are header fields of an Ethernet packet in compliance with the TSN standards specified by IEEE 802.1 working groups, while the Subtype is a portion of the payload field of an Ethernet packet in compliance with the TSN standards specified by IEEE 802.1 working groups.

In one embodiment, each stream ID in the mappings may be presented as a combination of an Ethertype and a Subtype (e.g., the first byte of the payload field), and each VLAN tag in the mappings may include a VLAN ID (VID) and a Priority Code Point (PCP), wherein the VID and the PCP are header fields in an Ethernet packet in compliance with the TSN standards specified by IEEE 802.1 working groups.

In another embodiment, each stream ID in the mappings may be presented as a combination of a DA and an SA, and each VLAN tag in the mappings may include a VID and a PCP.

Based on the received mapping, each of the network devices 111A~111D may look up the mapping to see if the stream ID of a packet matches one of the stream IDs in the mapping. For example, if there's a match, the network device 111A may perform VLAN tag manipulation (i.e., VLAN tag insertion and removal) on the packet. By the VLAN tag manipulation, interoperability between the TSN network 110 and the non-TSN network 120 may be achieved.

Alternatively, if there's a match, the network device 111B/111C/111D may perform VLAN tag replacement to the packet. By the VLAN tag replacement, packets may be routed in the TSN network 110 using a communication path with deterministically bounded latency.

It should be understood that the components described in the embodiment of FIG. 1 are for illustrative purposes only and are not intended to limit the scope of the application. For example, the TSN network 110 may include less or more network devices and terminal devices. Alternatively, the TSN network 110 may be connected between two non-TSN networks to allow data streams to be communicated between the non-TSN networks via the TSN network 110.

Figure 2:
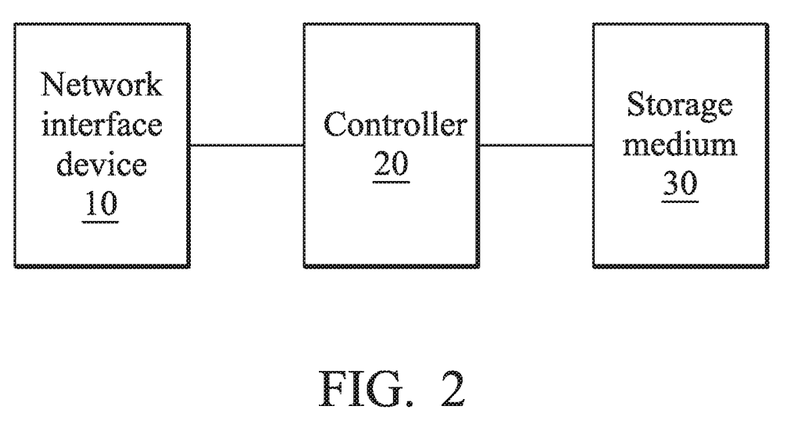
FIG. 2 is a block diagram illustrating the network device 111A according to an embodiment of the application.

FIG. 2 is a block diagram illustrating the network device 111A according to an embodiment of the application.

As shown in FIG. 2, the network device 111A may include a network interface device 10, a controller 20, and a storage medium 30.

The network interface device 10 is configured to provide the function of data streams communication (e.g., over Ethernet) between the TSN network 110 and the non-TSN network 120.

The controller 20 may be a general-purpose processor, a Micro Control Unit (MCU), a Digital Signal Processor (DSP), or the like, which includes various circuits for providing the functions of data processing and computing, controlling the network interface device 10 for communicating data streams between the TSN network 110 and the non-TSN network 120, and storing and retrieving data (e.g., a mapping of stream IDs to VLAN tags, and a mapping of stream IDs to VLAN tag indications) to and from the storage medium 30.

In particular, the controller 20 coordinates the aforementioned operations of the network interface device 10 and the storage medium 30 for performing the methods of the present application.

As will be appreciated by persons skilled in the art, the circuits of the controller 20 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage medium 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., a mapping of stream IDs to VLAN tags, and a mapping of stream IDs to VLAN tag indications), instructions, and/or program code of applications, communication protocols, and/or the methods of the present application.

It should be understood that the components described in the embodiment of FIG. 2 are for illustrative purposes only and are not intended to limit the scope of the application. For example, the network device 111A may include more components, such as an Input/Output (I/O) device (e.g., one or more buttons, one or more light emitters, a speaker, a keyboard, a mouse, a touch pad, and/or a display device).

Figure 3A:
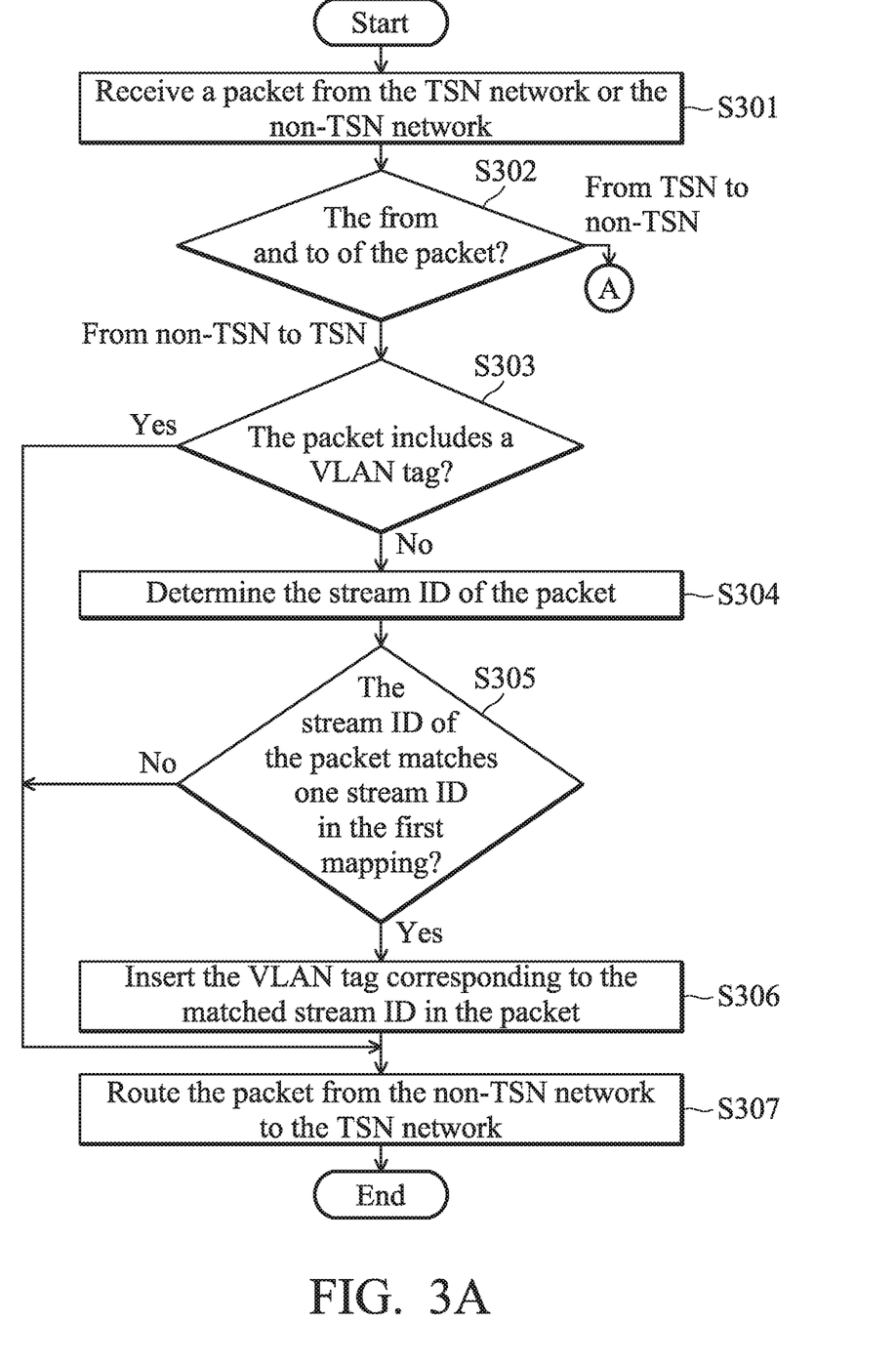
FIGS. 3A~3B show a flow chart illustrating the method for routing packets between a TSN network and a non-TSN network according to an embodiment of the application.
Figure 3B:
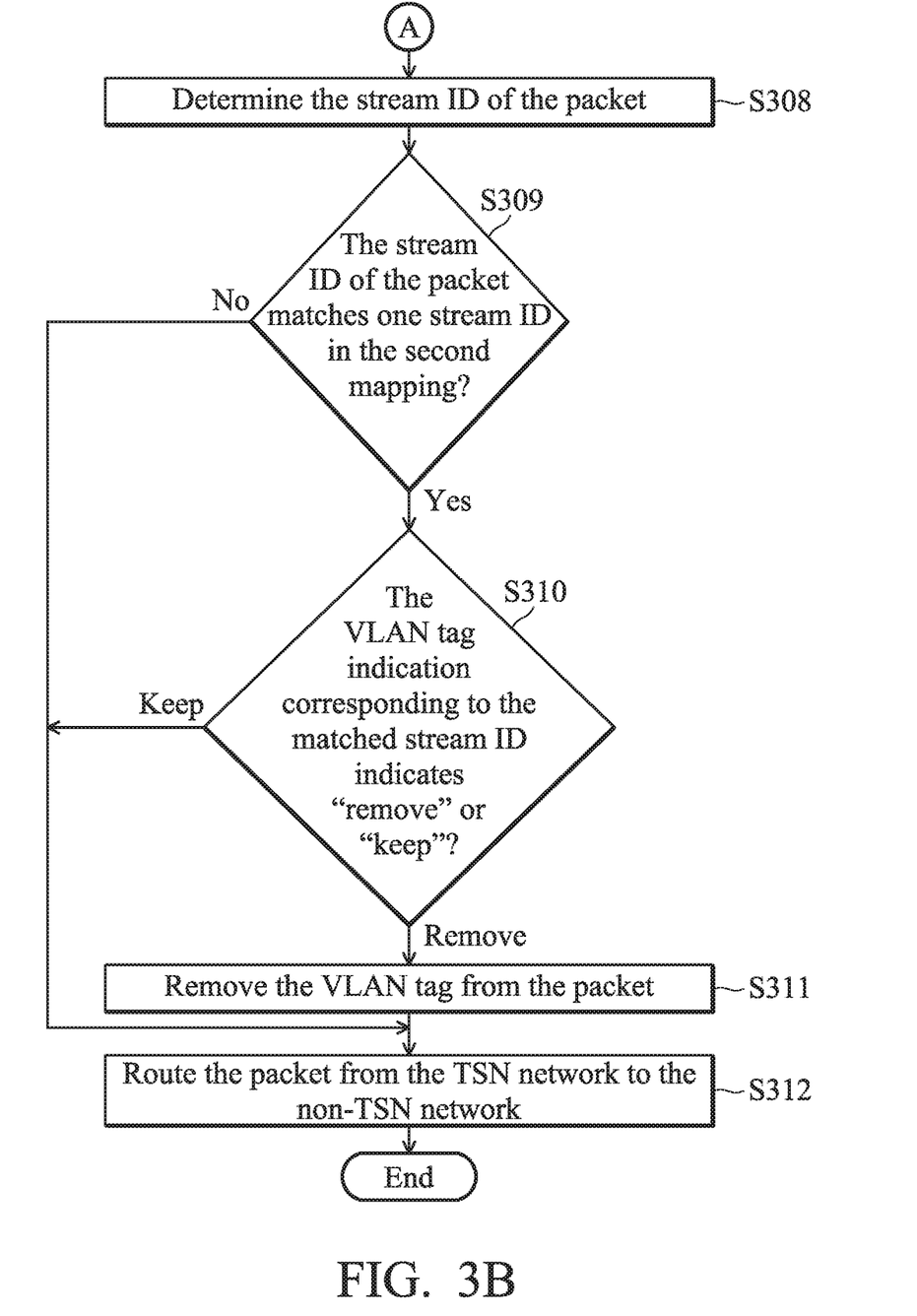

FIGS. 3A~3B show a flow chart illustrating the method for routing packets between a TSN network and a non-TSN network according to an embodiment of the application.

In this embodiment, the method may be applied to and executed by a network device (e.g., the network device 111A) connecting a TSN network (e.g., the TSN network 110) and a non-TSN network (e.g., the non-TSN network 120).

To begin with, the network device receives a packet from the TSN network or the non-TSN network (step S301).

Next, the network device determines whether the packet comes from the non-TSN network to the TSN network, or comes from the TSN network to the non-TSN network (step S302).

Subsequent to step S302, if the packet comes from the non-TSN network to the TSN network, the network device determines whether the packet includes a VLAN tag (step S303).

In one embodiment, the VLAN tag may include a VID and a PCP.

Subsequent to step S303, if the packet does not include any VLAN tag, the network device determines the stream ID of the packet (step S304).

In one embodiment, the stream ID may refer to at least one of the Ethertype and the Subtype of the packet.

In another embodiment, the stream ID may refer to the combination of the DA and the SA of the packet.

Subsequent to step S304, the network device determines whether the stream ID of the packet matches one of the stream IDs in a first mapping of stream IDs to VLAN tags (step S305).

Subsequent to step S305, if the stream ID of the packet matches one of the stream IDs in the first mapping, the network device inserts the VLAN tag corresponding to the matched stream ID in the packet (step S306), and routes the packet from the non-TSN network to the TSN network (step S307), and the method ends.

Back to step S303, if the packet includes a VLAN tag, the method proceeds to step S307.

Back to step S305, if the stream ID of the packet does not match any of the stream IDs in the predetermined mapping, the method proceeds to step S307.

Back to step S302, if the packet comes from the TSN network to the non-TSN network, the network device determines the stream ID of the packet (step S308), and then determines whether the stream ID of the packet matches one of the stream IDs in a second mapping of stream IDs to VLAN tag indications (step S309).

Subsequent to step S309, if the stream ID of the packet matches one of the stream IDs in the second mapping, the network device determines whether the VLAN tag indication corresponding to the matched stream ID in the second mapping indicates to remove or keep the VLAN tag in the packet (step S310).

Subsequent to step S310, if the VLAN tag indication indicates to remove the VLAN tag in the packet, the network device removes the VLAN tag from the packet (step S311), and routes the packet from the TSN network to the non-TSN network (step S312), and the method ends.

Subsequent to step S310, if the VLAN tag indication indicates to keep the VLAN tag in the packet, the method proceeds to step S312.

Back to step S309, if the stream ID of the packet does not match any of the stream IDs in the second mapping, the method proceeds to step S312.

Figure 4:
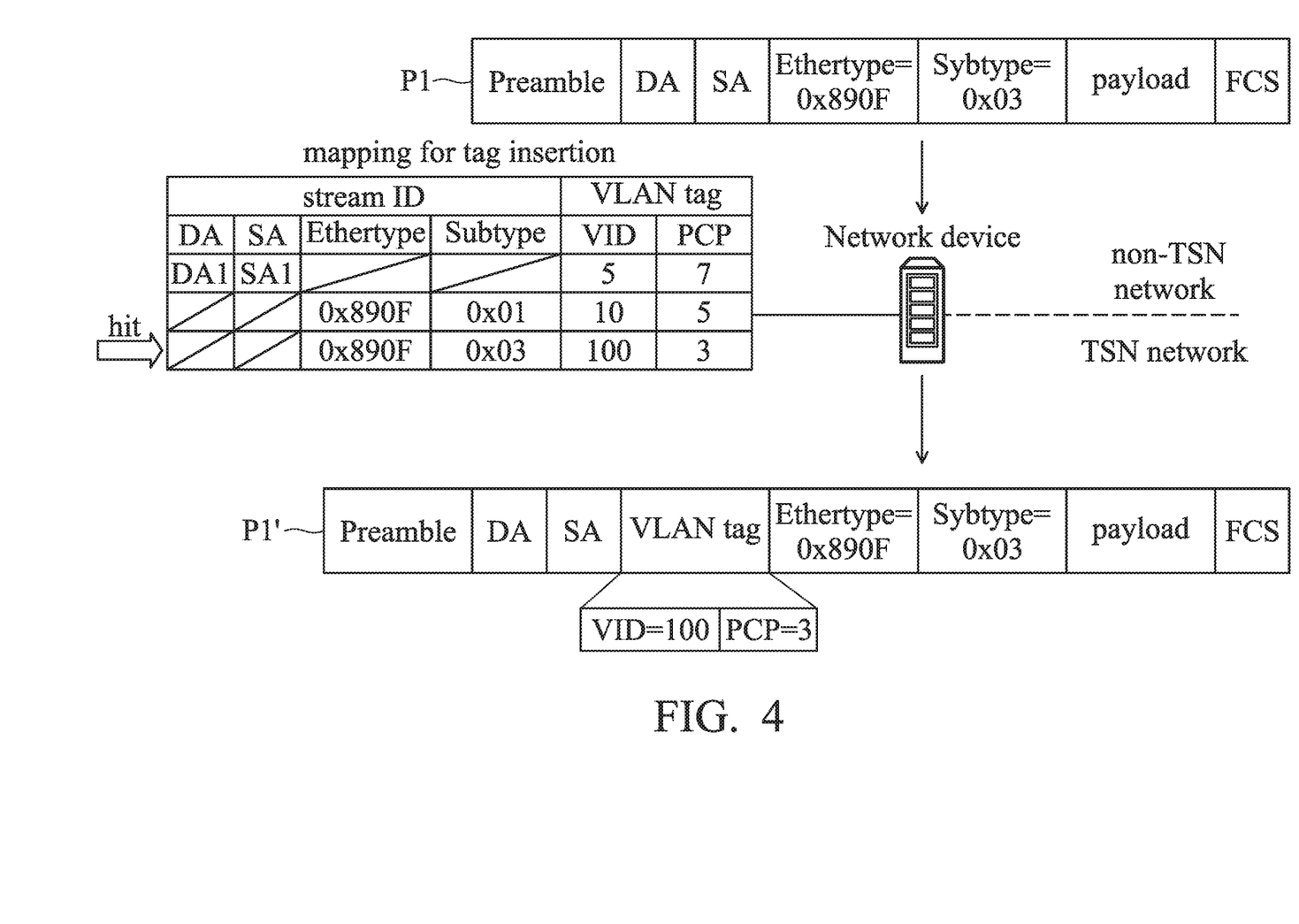
FIG. 4 is a schematic diagram illustrating VLAN tag insertion according to an embodiment of the application.

FIG. 4 is a schematic diagram illustrating VLAN tag insertion according to an embodiment of the application.

In this embodiment, the packet P1 from a non-TSN network is received at the network device, and a VLAN tag is inserted in the packet P1 according to the mapping received from the CNC server, thereby enabling interoperability between the TSN network and the non-TSN network.

As shown in FIG. 4, the mapping specifies the correspondences between a plurality of stream IDs and a plurality of VLAN tags, wherein each of the stream IDs is presented as a combination of a DA and an SA or as a combination of an Ethertype and a Subtype (e.g., the first byte of the payload field), while each of the VLAN tags is presented as a combination of a VID and a PCP.

For example, the combination of an DA with a value denoted as DA1 and an SA with a value denoted as SA1 indicates that the protocol encapsulated in a packet is EtherCAT. The combination of an Ethertype with a hexadecimal value of 0x890F and a Subtype with a hexadecimal value of 0x00~0xBF indicates that the protocol encapsulated in a packet is Control and Communication Link using Industrial Ethernet (CC-Link IE) Controller or Field.

The packet P1 includes a 8-byte preamble field, a 6-byte DA field, a 6-byte SA field, a 2-byte Ethertype field, a 1-byte Subtype field, a payload field, and a 4-byte Frame Check Sequence (FCS) field.

In particularly, the hexadecimal value of the Ethertype field of the packet P1 is 0x890F, and the hexadecimal value of the Subtype field of the packet P1 is 0x03.

The network device looks up the mapping and finds that there's a match for the combination of the Ethertype and the Subtype of the packet P1. Specifically, in the mapping, the combination of Ethertype=0x890F and Subtype=0x03 corresponds to a VLAN tag including a VID=100 and a PCP=3.

In response to the match, the network device inserts the VLAN tag with VID=100 and PCP=3 in the packet P1, thereby transforming the packet P1 into packet P1'.

Figure 5:
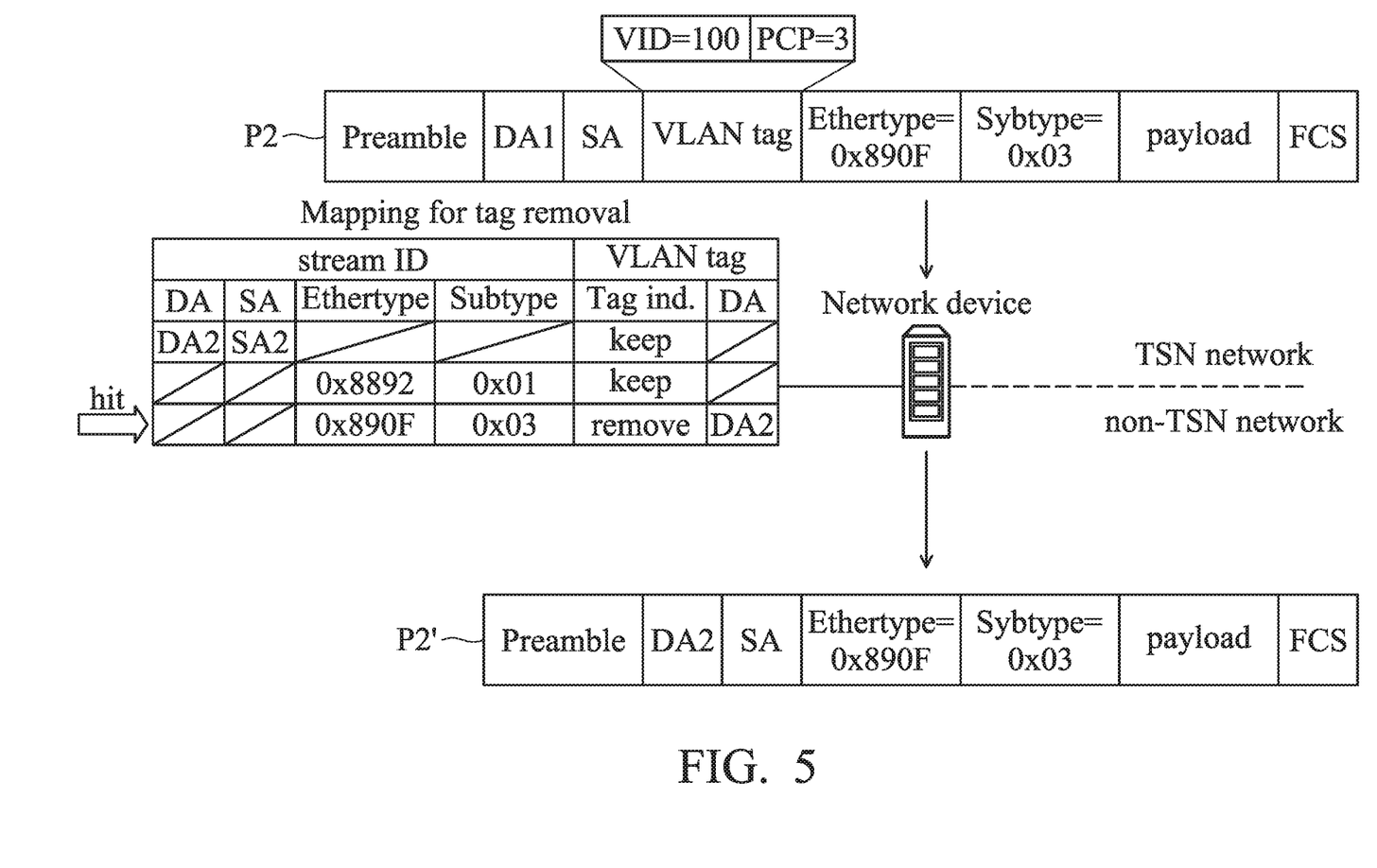
FIG. 5 is a schematic diagram illustrating VLAN tag removal according to another embodiment of the application.

FIG. 5 is a schematic diagram illustrating VLAN tag removal according to another embodiment of the application.

In this embodiment, the packet P2 from the TSN network is received at the network device, and the VLAN tag in the packet P2 are removed according to the mapping received from the CNC server, thereby enabling interoperability between the TSN network and the non-TSN network.

As shown in FIG. 5, the mapping specifies the correspondences between a plurality of stream IDs and a plurality of VLAN tag indications and DAs, wherein each of the stream IDs is presented as a combination of a DA and an SA or as a combination of an Ethertype and a Subtype, while each of the VLAN tag indications indicates whether a VLAN tag should be kept or removed.

The packet P2 includes a 8-byte preamble field, a 6-byte DA field, a 6-byte SA field, a 4-byte VLAN tag, a 2-byte Ethertype field, a 1-byte Subtype field, a payload field, and a 4-byte FCS field.

In particularly, the DA field of the packet P2 is denoted as DA1, the hexadecimal value of the Ethertype field of the packet P2 is 0x890F, and the hexadecimal value of the Subtype field of the packet P2 is 0x03. The VLAN tag may include a 2-byte TPID field, a 3-bits PCP field, a 1-bit CFI field, and a 12-bit VID filed, wherein the decimal value of the VID field is 100 and the decimal value of the PCP field is 3.

The network device looks up the mapping and finds that there's a match for the combination of the Ethertype and the Subtype of the packet P2. Specifically, the combination of Ethertype=0x890F and Subtype=0x03 corresponds to a VLAN tag indication "remove" and DA=DA2.

In response to the match, the network device removes the VLAN tag from the packet P2, and replaces the DA=DA1 in the packet P2 with DA=DA2 matched in the mapping, thereby transforming the packet P2 into packet P2'.

In view of the forgoing embodiments, it will be appreciated that the present application realizes interoperability between TSN networks and non-TSN networks, by inserting or removing VLAN tags in or from the packets routed between TSN networks and non-TSN networks. Advantageously, the VLAN tag manipulation may maintain the real-time deterministic behavior of data stream communication within the TSN networks.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. An apparatus, comprising:
a storage medium, configured to store a first mapping of one or more first stream Identifiers (IDs) to one or more first Virtual Local Area Network (VLAN) tags, and a second mapping of the one or more first stream IDs to one or more VLAN tag indications; and
a controller, coupled to the storage medium, and configured to route at least one packet between a Time-Sensitive Networking (TSN) network and a non-TSN network according to the first mapping and the second mapping;
wherein the routing of the packet comprises:
identifying a second stream ID of the packet;
determining whether the second stream ID matches one of the first stream IDs in the first mapping or in the second mapping;
in response to the second stream ID matching one of the first stream IDs and the packet being routed from the non-TSN network to the TSN network, inserting a VLAN tag in the packet based on the first VLAN tag corresponding to the matched first stream ID in the first mapping; and
in response to the second stream ID matching one of the first stream IDs and the packet being routed from the TSN network to the non-TSN network, removing a VLAN tag from the packet based on the VLAN tag indication corresponding to the matched first stream ID in the second mapping.

2. The apparatus as claimed in claim 1, wherein the routing of the packet further comprises determining whether the packet comprises any VLAN tag, and the inserting of the VLAN tag in the packet is performed in response to the packet not comprising any VLAN tag.

3. The apparatus as claimed in claim 1, wherein each of the first stream IDs and the second stream ID is presented as at least one of the following:
a Destination Address (DA);
a Source Address (SA);
an Ethertype; and
a Subtype.

4. The apparatus as claimed in claim 3, wherein each of the first stream IDs and the second stream ID is presented as a combination of the Ethertype and the Subtype, and the Ethertype is a header field of an Ethernet packet in compliance with TSN standards specified by Institute of Electrical and Electronics Engineers (IEEE) 802.1 working groups, while the Subtype is a portion of a payload field of the Ethernet packet.

5. The apparatus as claimed in claim 3, wherein each of the first stream IDs and the second stream ID is presented as a combination of the DA and the SA, and the DA and the SA are header fields of an Ethernet packet in compliance with TSN standards specified by Institute of Electrical and Electronics Engineers (IEEE) 802.1 working groups.

6. The apparatus as claimed in claim 1, wherein each of the first VLAN tags comprises a VLAN ID (VID) and a Priority Code Point (PCP), and the VID and the PCP are fields in an Ethernet packet in compliance with TSN standards specified by Institute of Electrical and Electronics Engineers (IEEE) 802.1 working groups.

7. The apparatus as claimed in claim 1, wherein the VLAN tag indication indicates to remove or keep the VLAN tag in the packet routed from the TSN network to the non-TSN network.

8. The apparatus as claimed in claim 1, wherein the second mapping also specifies one or more correspondences between the one or more first stream IDs and one or more first Destination Addresses (DAs), and the routing of the packet further comprises:
in response to the second stream ID matching one of the first stream IDs and the packet being routed from the TSN network to the non-TSN network, replacing a second DA in the packet with the first DA corresponding to the matched first stream ID.

9. The apparatus as claimed in claim 1, wherein the apparatus is a network gateway connecting the TSN network and the non-TSN network.

10. A method, executed by an apparatus connecting a Time-Sensitive Networking (TSN) network and a non-TSN network, the method comprising:
- routing at least one packet between the TSN network and the non-TSN network according to a first mapping of one or more first stream Identifiers (IDs) to one or more first Virtual Local Area Network (VLAN) tags and a second mapping of the one or more first stream IDs to one or more VLAN tag indications;
- wherein the routing of the packet comprises:
  - identifying a second stream ID of the packet;
  - determining whether the second stream ID matches one of the first stream IDs in the first mapping or in the second mapping;
  - in response to the second stream ID matching one of the first stream IDs and the packet being routed from the non-TSN network to the TSN network, inserting a VLAN tag in the packet based on the first VLAN tag corresponding to the matched first stream ID in the first mapping; and
  - in response to the second stream ID matching one of the first stream IDs and the packet being routed from the TSN network to the non-TSN network, removing a VLAN tag from the packet based on the VLAN tag indication corresponding to the matched first stream ID in the second mapping.

11. The method as claimed in claim 10, wherein the routing of the packet further comprises determining whether the packet comprises any VLAN tag, and the inserting of the VLAN tag in the packet is performed in response to the packet not comprising any VLAN tag.

12. The method as claimed in claim 10, wherein each of the first stream IDs and the second stream ID is presented as at least one of the following:
- a Destination Address (DA);
- a Source Address (SA);
- an Ethertype; and
- a Subtype.

13. The method as claimed in claim 12, wherein each of the first stream IDs and the second stream ID is presented as a combination of the Ethertype and the Subtype, and the Ethertype is a header field of an Ethernet packet in compliance with TSN standards specified by Institute of Electrical and Electronics Engineers (IEEE) 802.1 working groups, while the Subtype is a portion of a payload field of the Ethernet packet.

14. The method as claimed in claim 12, wherein each of the first stream IDs and the second stream ID is presented as a combination of the DA and the SA, and the DA and the SA are header fields of an Ethernet packet in compliance with TSN standards specified by Institute of Electrical and Electronics Engineers (IEEE) 802.1 working groups.

15. The method as claimed in claim 10, wherein each of the first VLAN tags comprises a VLAN ID (VID) and a Priority Code Point (PCP), and the VID and the PCP are fields in an Ethernet packet in compliance with TSN standards specified by Institute of Electrical and Electronics Engineers (IEEE) 802.1 working groups.

16. The method as claimed in claim 10, wherein the VLAN tag indication indicates to remove or keep the VLAN tag in the packet routed from the TSN network to the non-TSN network.

17. The method as claimed in claim 10, wherein the second mapping also specifies one or more correspondences between the one or more first stream IDs and one or more first Destination Addresses (DAs), and the routing of the packet further comprises:
- in response to the second stream ID matching one of the first stream IDs and the packet being routed from the TSN network to the non-TSN network, replacing a second DA in the packet with the first DA corresponding to the matched first stream ID.

\* \* \* \* \*